(12) United States Patent
Schönebeck et al.

(10) Patent No.: US 6,981,738 B2
(45) Date of Patent: Jan. 3, 2006

(54) SEAL FOR MOVABLE VEHICLE ROOF

(75) Inventors: Horst Schönebeck, Gelnhaus (DE); Christian Biewer, Münster-Altheim (DE)

(73) Assignee: ArvinMeritor, GmbH, (DE)

( * ) Notice: Subject to any disclaimer, the term of this patent is extended or adjusted under 35 U.S.C. 154(b) by 0 days.

(21) Appl. No.: 10/784,653

(22) Filed: Feb. 23, 2004

(65) Prior Publication Data
US 2004/0169403 A1    Sep. 2, 2004

(30) Foreign Application Priority Data
Feb. 27, 2003   (DE) ............................... 103 08 592

(51) Int. Cl.
*B60J 7/047*    (2006.01)
*B60J 10/12*    (2006.01)
(52) U.S. Cl. ........................... 296/216.09; 296/216.03; 296/216.08
(58) Field of Classification Search ..............................
296/216.06–216.09, 220.01, 216.03

See application file for complete search history.

(56) References Cited

U.S. PATENT DOCUMENTS

| 2,701,395 | A | * | 2/1955 | Barroero ..................... 49/495.1 |
| 4,667,966 | A | * | 5/1987 | Oehrle et al. ................ 277/645 |
| 4,701,376 | A | * | 10/1987 | Hermann et al. ........... 428/358 |
| 5,039,161 | A | * | 8/1991 | Schmidhuber et al. ...... 296/212 |
| 5,311,702 | A | * | 5/1994 | Moore ........................ 49/495.1 |
| 6,547,320 | B2 | * | 4/2003 | Kohout et al. .............. 296/223 |

\* cited by examiner

*Primary Examiner*—Dennis H. Pedder
(74) *Attorney, Agent, or Firm*—Carlson, Gaskey & Olds

(57) ABSTRACT

A seal for the guide of an openable vehicle roof has an elastic sealing profile and a harder sealing strip that is mounted thereon and that is configured as a separate part. When the seal must be compressed, in order to make space for a connecting member between the longitudinal guide and the raised cover panel, only the sliding strip is contacted so that the sealing element is not subjected to any wear and tear.

25 Claims, 6 Drawing Sheets

US 6,981,738 B2

SEAL FOR MOVABLE VEHICLE ROOF

REFERENCE TO RELATED APPLICATIONS

The present invention claims the benefit of German Patent Application No. 103 08 592.0, filed Feb. 27, 2003.

TECHNICAL FIELD

The invention relates to a seal for a guide of a cover panel of an openable vehicle roof, comprising an elastic sealing profile having a reverse side for mounting and a sealing side. The invention also relates to a vehicle roof having at least one cover panel that is slidable and tiltable to selectively cover a roof opening, lateral longitudinal guides for the cover panel, and at least one connecting member between a longitudinal guide and the cover panel.

BACKGROUND OF THE INVENTION

There are currently vehicle roofs designed with movable cover panels. These roofs usually comprise a roof opening, at least one cover panel that is slidable and tiltable to selectively cover the roof opening, lateral longitudinal guides for the cover panel, and at least one connecting member between a longitudinal guide and the cover panel. Vehicle roofs of this type are also called spoiler roofs, in which the cover panel tilts over the roof surface and then can be slid towards the rear above the roof surface.

To expose the greatest possible surface area of the roof opening, the cover panel is at least partially slid over a non-moveable, stationary roof segment. Longitudinal guides are arranged to the side of this roof segment. The cover panel moves into the area of these longitudinal guides, which nevertheless up to this point in time are closed to the outside by a seal that is disposed above the cover panel to protect the longitudinal guides, the interior, and the entire tilting and sliding mechanism from adverse environmental conditions, especially dirt and humidity.

Great demands are placed on seals of this type. After the cover panel is tilted, it remains connected to the longitudinal guides via connecting members, usually cranks or coulisses made of metal. If the cover panel, along with the connecting members, is displaced and arrives in the area of the seal, the connecting members push the seal to the side. The result is relatively high wear and tear and a large amount of flexing, which significantly increases the displacement forces required to move the cover panel.

There is a desire for a seal structure that can withstand the demands of the cover panel movement without experiencing the excessive wear and tear of existing structures.

SUMMARY OF THE INVENTION

The present invention is directed to a seal as well as a vehicle roof having a seal, in which the seal experiences a significantly smaller amount of flex as the cover panel is moved, significantly reducing the amount of friction and wear and tear on the seal.

A seal according to one embodiment of the invention includes a separate sliding strip or latch that is attached to a sealing profile of the seal. This sliding strip, which is advantageously attached to the sealing side of the sealing profile, acts as a contact surface for the connecting members so that they do not have to slide directly against the resilient, soft material of the seal profile itself. The sliding strip does not influence the sealing behavior in any way because the sealing profile itself performs the sealing function outside the area of the sliding strip. As a result, the seal has functionally different segments made of different materials, namely the soft sealing profile for sealing and deformation, and the relatively hard sliding strip for easy sliding and the application of force.

When the seal is in an unstressed state, the sliding strip is recessed from at least one sealing surface on the sealing side of the sealing profile. This is to assure that the sliding strip does not influence the sealing effect because the sealing surface of the sealing profile protrudes laterally to be able to contact a part situated opposite the seal and to seal the part off.

According to one embodiment of the present invention, the vehicle roof of the type cited above has longitudinal guides that are each at least partially shielded from the outside by the seal. The associated connecting member, when the cover panel is moved, contacts the sliding strip and compresses the sealing profile without actually touching the sealing profile itself. The connecting member thus assures deformation of the sealing profile to expose a gap through which the connecting member can protrude to the outside.

The seal according to the present invention can be used with any type of openable panel in addition to the spoiler roofs discussed above. More particularly, the inventive seal structure can be used in any vehicle panel structure where good sealing properties and good sliding properties are both desired.

In the tilted and displaced state of the cover panel, the vehicle panel according to one embodiment of the present invention is designed such that the connecting member extends from the associated longitudinal guide along the seal up to the cover panel that is situated over the panel surface. However, in this context, the connecting member makes contact with the seal only on the sealing strip.

If the seal needs to seal a large gap, two seals can be placed next to each other such that their sealing surfaces are compressed against each other to assure the seal. The connecting member then presses the seals apart as it slides.

BRIEF DESCRIPTION OF THE DRAWINGS

Further features and advantages of the present invention will become apparent from the discussion below and from the drawings below, to which reference is made.

In the drawings.

DETAILED DESCRIPTION OF THE EMBODIMENTS

Figure 1:
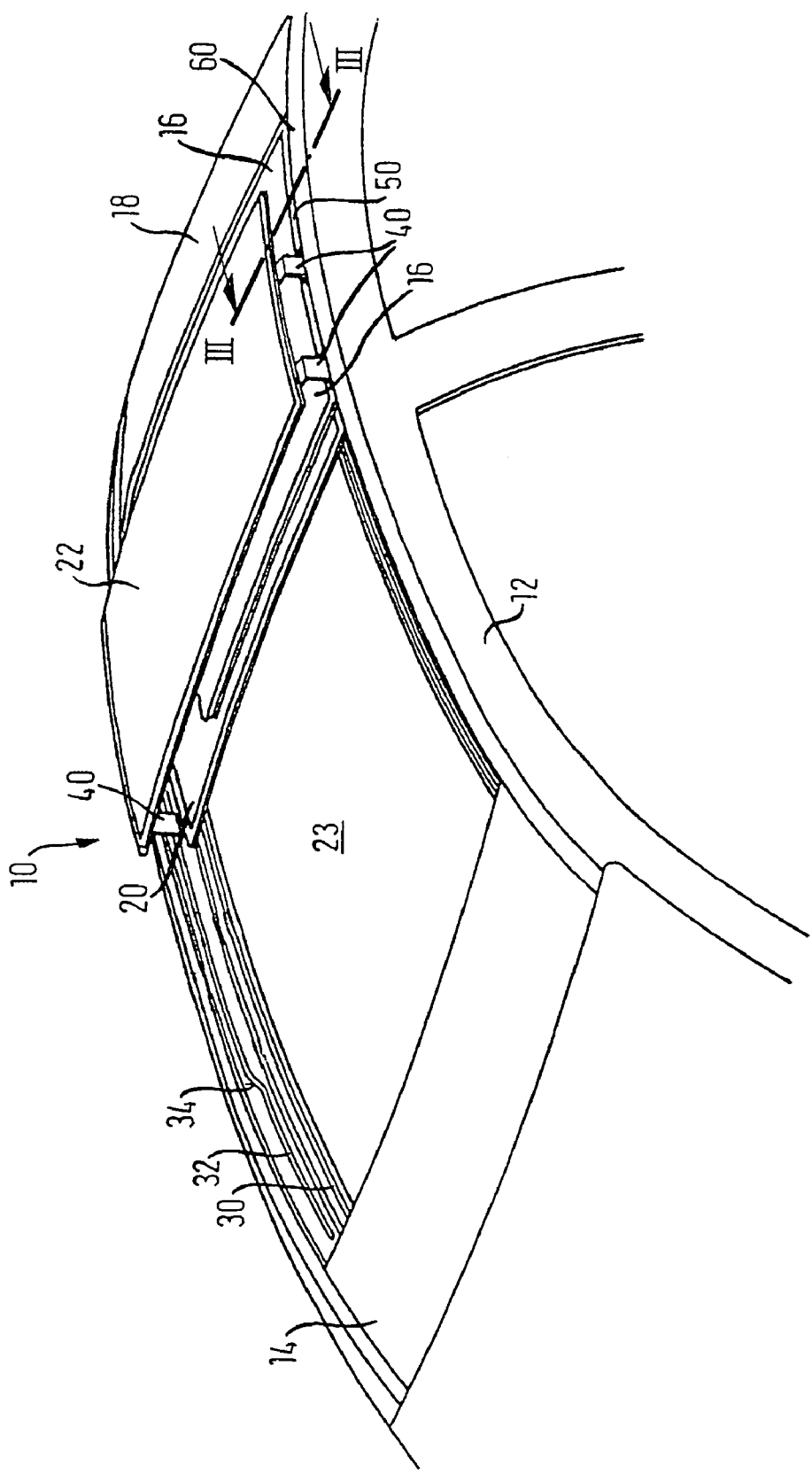
FIG. 1 is a perspective view of one embodiment of an inventive vehicle roof with an exposed roof opening.

The present invention is generally directed to a seal as well as a vehicle roof having a seal, in which the seal experiences a significantly smaller amount of flex as the cover panel is moved, significantly reducing the amount of friction and wear and tear on the seal.

A seal according to one embodiment of the invention includes a separate sliding strip or latch that is attached to a sealing profile of the seal. This sliding strip, which is advantageously attached to the sealing side of the sealing profile, acts as a contact surface for the connecting members so that they do not have to slide directly against the soft material forming the seal profile itself. The sliding strip is advantageously made of hard plastic, but it could also be made of metal. The sliding strip markedly improves the sliding properties of the overall seal, especially when the sliding surface is configured to have a very small peak-to-valley height. The sliding strip does not influence the sealing behavior in any way because the sealing profile itself performs the sealing function outside the area of the sliding strip. As a result, the seal has functionally different segments made of different materials, namely the soft sealing profile for sealing and deformation, and the relatively hard sliding strip for easy sliding and application of force.

The sliding strip is advantageously accommodated in the sealing profile in a form-locking manner and has its sliding surface partially protruding from the sealing profile. Alternatively or additionally, the sliding strip can also be glued to the sealing profile, joined to the sealing profile by vulcanizing or other similar processes, or co-extruded with the sealing profile during manufacture of the seal.

When the seal is in an unstressed state, the sliding strip is recessed from at least one sealing surface on the sealing side of the sealing profile. This is to assure that the sliding strip does not influence the sealing effect because the sealing surface of the sealing profile protrudes laterally to be able to contact a part situated opposite the seal and to seal the part off.

In one embodiment, the sealing profile has a closed hollow profile, which provides a high degree of elasticity at a relatively low level of flex.

The sealing surface of the sealing profile is advantageously situated opposite a reverse side of the sealing profile so that compression stresses on the seal act perpendicular to the sealing surface and not parallel thereto.

The sealing profile in accordance with one embodiment of the invention has a B-shaped cross-section with two bulbous sealing surfaces. The sliding strip is disposed between the bulbous sealing surfaces. A sealing profile having this shape has been proven to be especially advantageous because it assures a very good sealing effect and relatively easy deformability while still allowing good and reliable accommodation of the sliding strip.

According to the present invention, the vehicle panel of the type cited above has longitudinal guides that are each at least partially shielded from the outside by the seal. The associated connecting member, when the cover panel is moved, contacts the sliding strip and compresses the sealing profile.

The connecting member thus assures deformation of the sealing profile to expose a gap through which the connecting member can protrude to the outside.

The connecting member according to one embodiment has an extension that contacts the sealing strip. The extension is particularly useful when the sliding strip is recessed from the sealing surface. The extension can be configured in a wedge-like fashion to make continuous compression of the sealing profile possible when the cover panel is displaced.

As noted above, in one embodiment, the seal should cover at least the segment of the longitudinal guide that runs beside a non-moveable, stationary roof segment area. The seal provides a sealing function with respect to the stationary roof segment when the cover panel is not displaced.

The seal according to the present invention can be used with any type of openable vehicle panel in addition to the spoiler roofs discussed above. More particularly, the inventive seal structure can be used in any vehicle roof structure where good sealing properties and good sliding properties are both desired.

In the tilted and displaced state of the cover panel, the vehicle panel according to one embodiment of the present invention is designed such that the connecting member extends from the associated longitudinal guide along the seal up to the cover panel that is situated over the panel surface. However, in this context, the connecting member makes contact with the seal only on the sealing strip.

The sealing strip should have good sliding properties, but it should also be sufficiently flexible such that it is deformed only in the area of the connecting member, when the connecting member is moved along. This is to minimize the formation of a gap that would otherwise be large enough to allow humidity to penetrate into the longitudinal guide.

If the seal needs to seal a large gap, two seals can be placed next to each other such that their sealing surfaces are compressed against each other to assure the seal. The connecting member then presses the seals apart as it slides.

The invention will now be discussed in greater detail with respect to the figures. FIG. 1 shows a vehicle roof panel 10, which is manufactured as a finished supplier part and which is secured to a roof frame 12. In the illustrated example, the vehicle roof panel 10 has stationary, non-moveable roof segments 14, 16, 18, that form the roof surface. In this context, one segment 16 is configured as a stationary glass panel, which assures a certain penetration of light for the front seat occupants.

The roof is openable by means of two cover panels 20, 22 that can be slid toward and away from the rear of the vehicle to cover and uncover a roof opening 23. Each cover panel 20, 22 has its own set of associated longitudinal guides 30, 32, respectively, which are disposed on both sides of their respective cover panels. One of the cover panels 20 is arranged to be displaceable in a linear direction; when it is displaced, the cover panel 20 slides to the rear under one of the roof segments 16, as depicted in FIG. 1. The other cover panel 22 is tiltable in the upward direction due to a jog 34 in the longitudinal guide 32 as well as displaceable toward the rear of the vehicle.

The connection between the first cover panel 22 and first set of associated longitudinal guides 32, which is advantageously executed as a coulisse guide, is realized by one or more connecting members 40. The connecting members 40 can be made of any rigid material, such as metal, and my also be hinged if desired. Both sets of longitudinal guides 30, 32 run along the sides of the stationary roof segment 16. At least in an area on the sides of the stationary roof segment 16, the longitudinal guides 30, 32 are sealed from above by a seal 50, which protects the longitudinal guides 30, 32 from the penetration of humidity and dirt.

Figure 2:
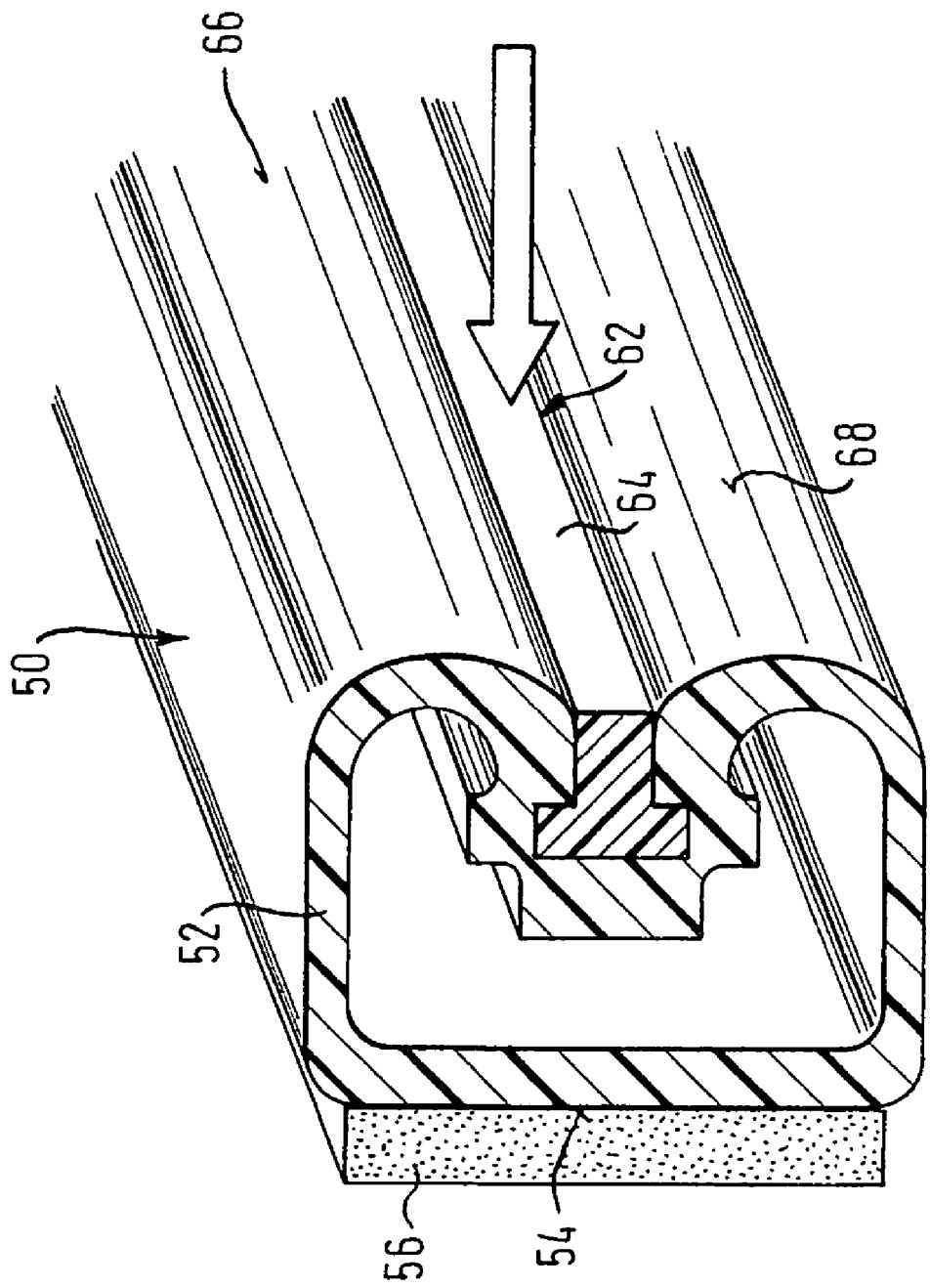
FIG. 2 is a perspective cutaway view of a seal according to one embodiment the present invention in the uninstalled state.

FIG. 2 shows this seal 50 in more detail. The seal 50 includes a sealing profile 52 made of elastic material, which runs in an elongated and hose-like manner and has a B-shaped, closed hollow profile in the illustrated embodiment. On a reverse side 54 of the sealing profile 52, a web adhesive band 56 is disposed for securing the entire seal 50 on the side of the roof segment 16 or on a lateral roof frame 60. On the sealing side opposite the reverse side 54, the seal 50 also has a sliding strip 62 made of a rigid material, such as plastic, having good sliding properties and running over the entire length of seal 50. The sliding resistance of the sliding strip 62 is less than the sliding resistance of the sealing profile 52, making the sliding strip 62 an appropriate surface for moving sliding components. In one embodiment, the hardness of the sliding strip 62 is significantly greater than the hardness of the sealing profile 52.

In the illustrated embodiment, the sliding strip 62 has a T-shape cross-section. The crossbar of the "T" is accommodated in a form-locking manner in a complementary recess in the sealing profile 52, and the longitudinal bar of the "T" protrudes slightly from the sealing profile 52 and has a sliding surface 64 that faces the outside of the seal when the seal 50 is in a stressed, compressed state. When the seal 50 is in an unstressed state (FIG. 2), the sliding surface 64 is recessed from the inside of the seal 50 from the two bulbous sealing surfaces 66 and 68 of the sealing profile 52. In the installed state (see FIG. 3), the seal 50 is attached at the upper end of the lateral frame 60 and sealingly closes off the stationary roof segment 16. In the illustrated embodiment, the stationary roof segment 16 includes a glass pane 70 and a frame-shaped foam structure 72 surrounding it. The lateral surface 74 of the upper bulbous sealing surface 66 contacts the frame-shaped foam structure 72 in a sealing manner.

Figure 3:
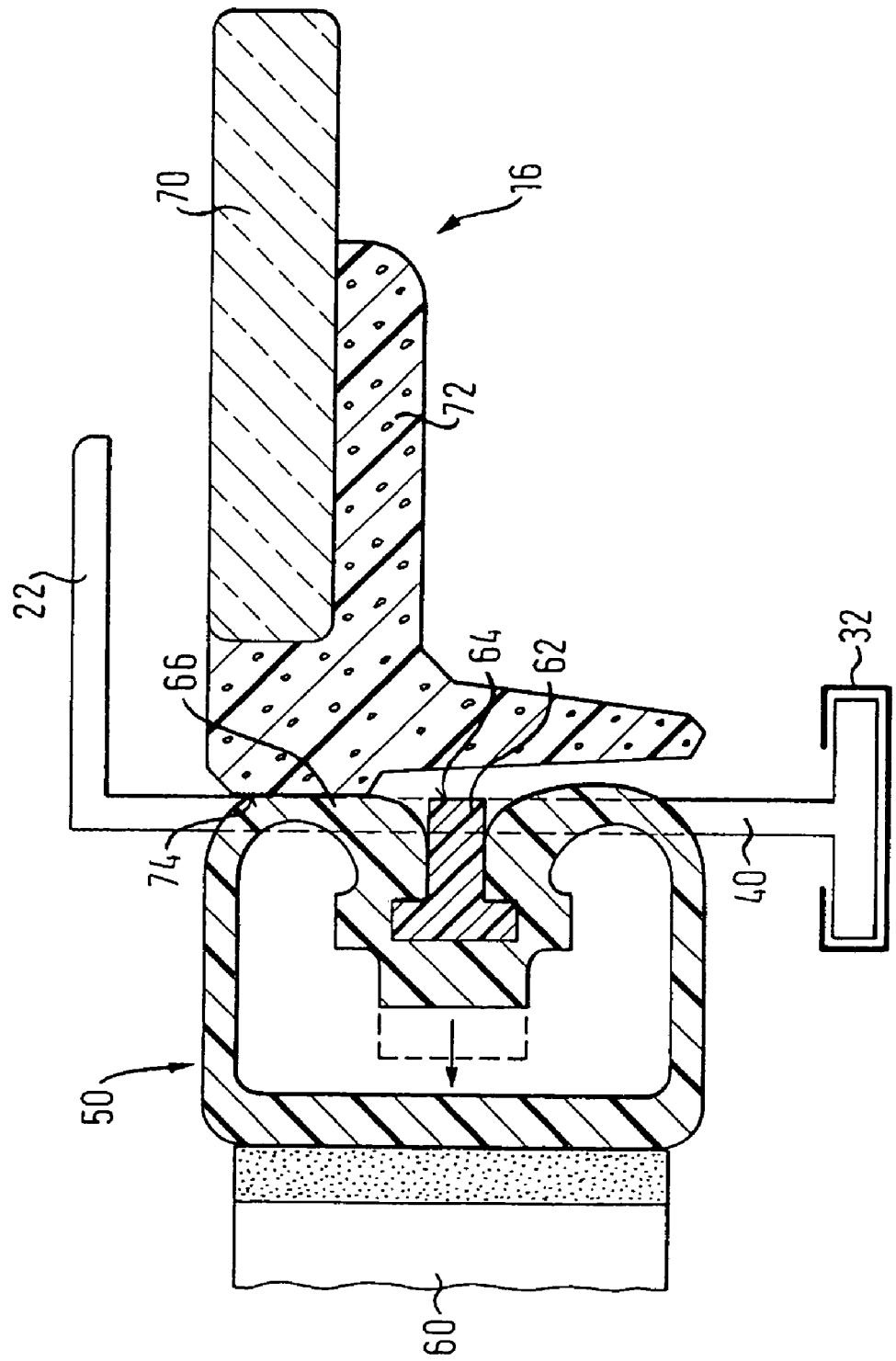
FIG. 3 is a schematic cross-sectional view taken along line III—III in FIG. 1 in the area of a left longitudinal guide in the direction of travel.

When the cover panel 22 is displaced toward the rear of the vehicle, the seal 50 is compressed (e.g., toward the left in the direction of the arrow shown in FIG. 3) so that the connecting members 40 can protrude from the longitudinal guide 32 in the upward direction up to the cover panel 22. For this purpose, the connecting members 40 in the area of the sliding surface 64 have an extension 80 with a wedge shape when viewed from above and that points toward the outside to the sliding surface 64. The extension 80 is disposed at a level so that it only contacts the sliding surface 64 and not the sealing profile 52

Figure 4:
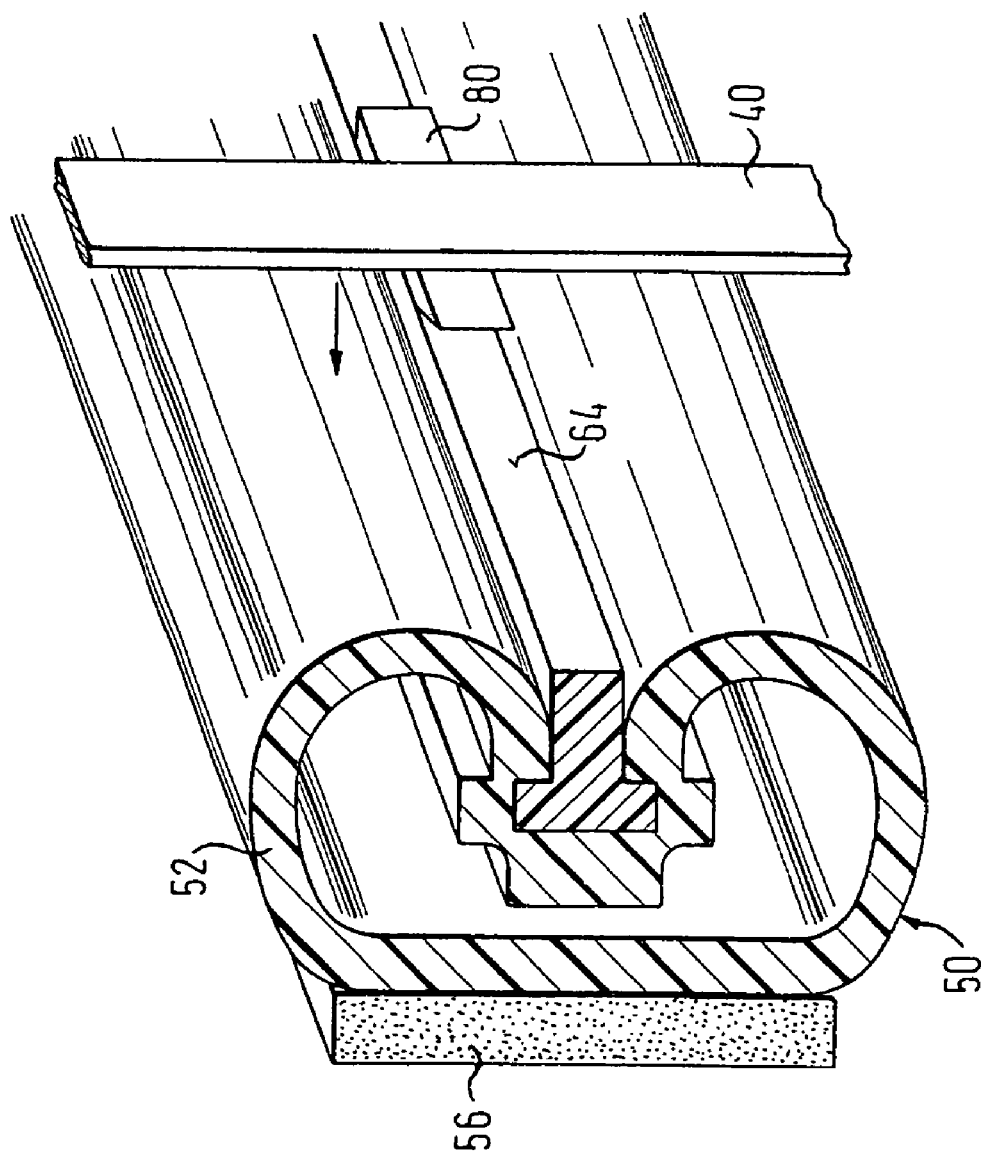
FIG. 4 is a perspective cutaway view of the seal in FIG. 2 with a connecting member in contact with the seal to compress the seal.
Figure 5:
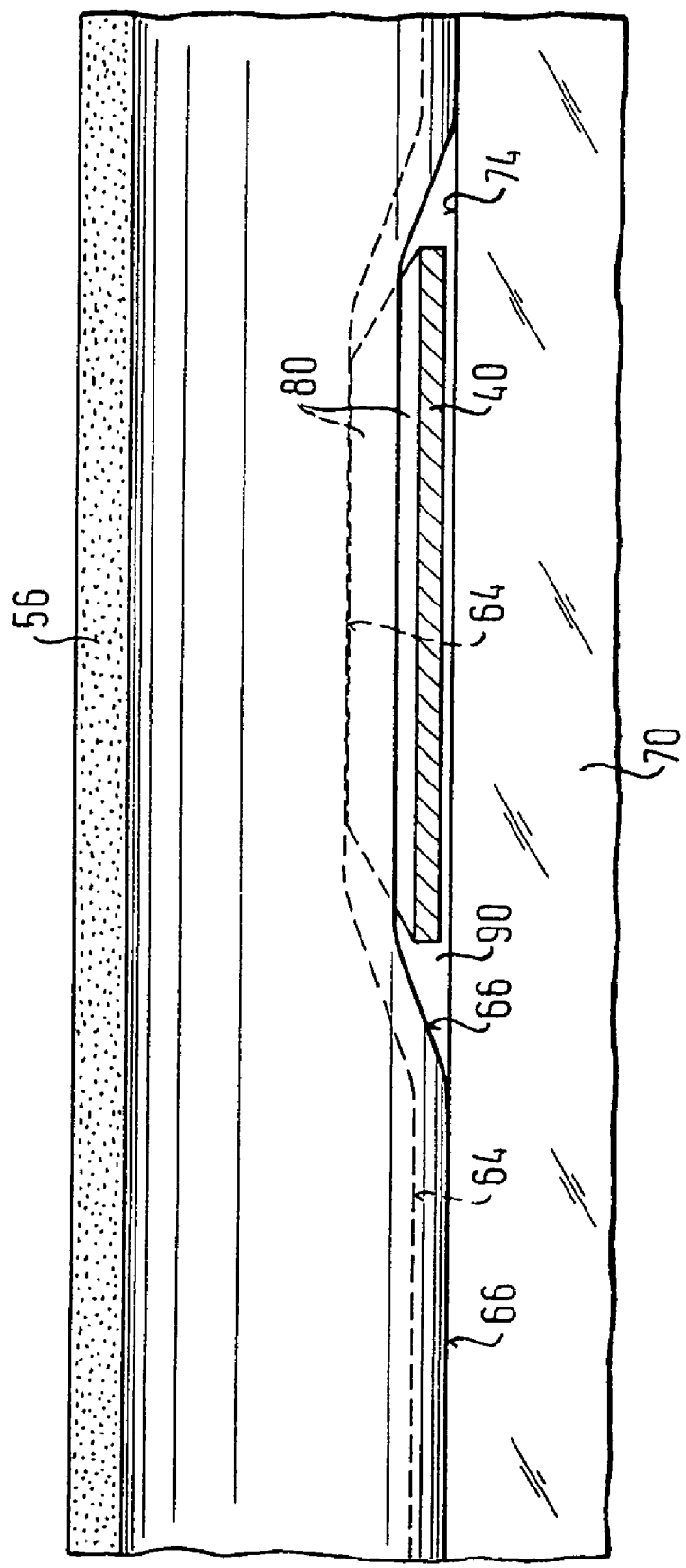
FIG. 5 is a schematic top cutaway view of an installed seal and a connecting member that protrudes through the seal.

If the cover panel 22 is tilted upward and is moved toward the rear of the vehicle, then the extension 80 presses against the sliding surface 64 to compress the sealing profile 52 (FIGS. 4 and 5). In this way, a gap 90 is created, and the connecting member 40 protrudes through the gap. The connecting member 40 does not contact the sealing profile 52 itself at all, ensuring no wear and tear on the sealing profile 52 as well as only a small amount of flex in the sealing profile 52.

Advantageously, in the vehicle longitudinal direction, the seal 50 resumes its sealing function at both ends of the extension 80, as depicted in FIG. 5, so that gap 90 is not too long to minimize any possibility of environmental contaminants entering the longitudinal guide 32. The seal 50 also can extend over the entire length of longitudinal guides 32, so that no two different seals border on each other.

Figure 6:
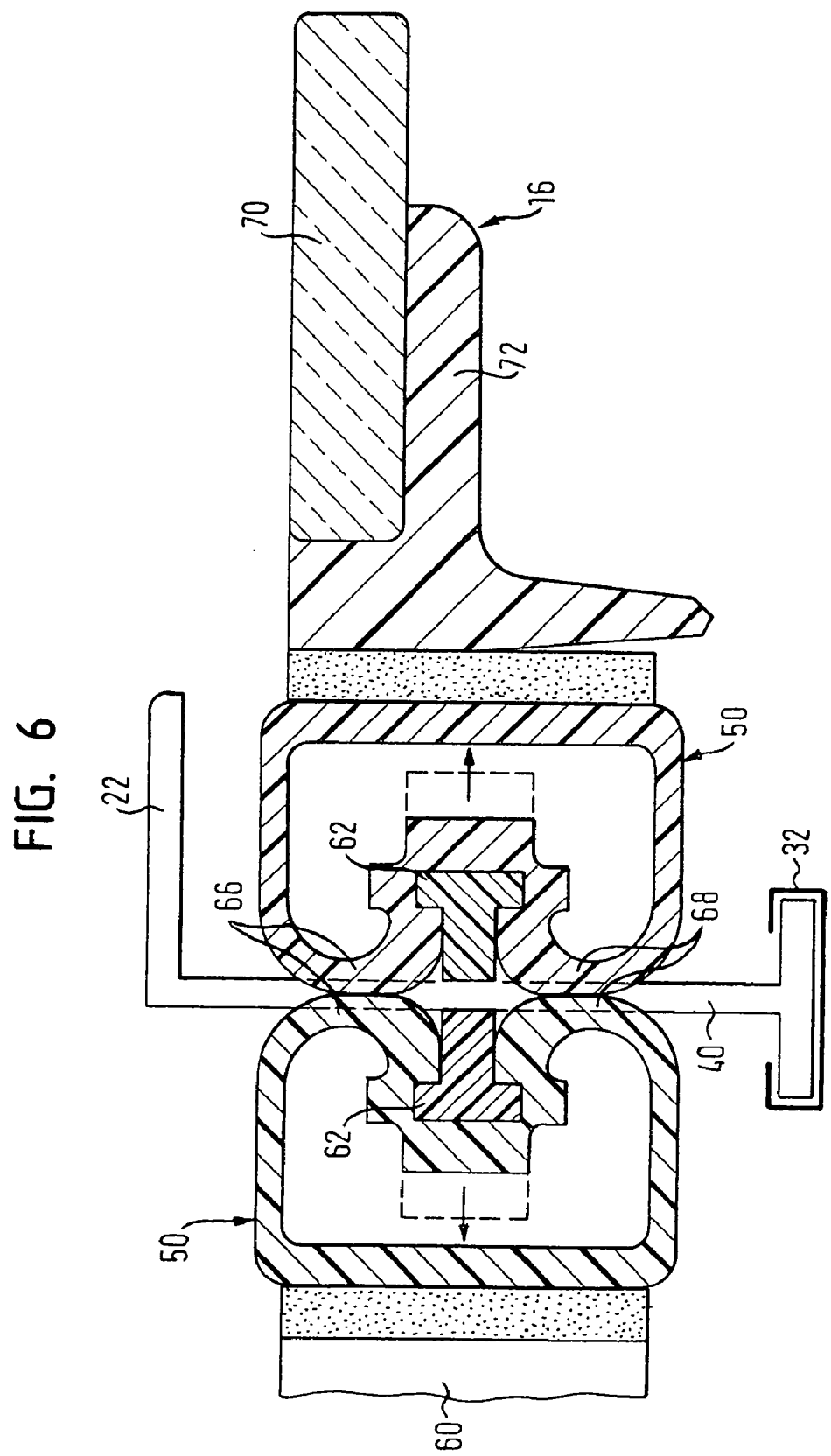
FIG. 6 is a schematic cross-sectional view of the seal according to another embodiment of the invention.

In the embodiment shown in FIG. 6, two seals 50 are positioned as mirror images of each other and contact each other at their respective sealing surfaces 66, 68 in a biased manner to seal a larger gap. The connecting member 40 then presses to the outside both against sliding surfaces 64 and seals 50 in opposite directions. This embodiment is particularly useful for sealing larger gaps while still taking advantage of the properties of the inventive structure.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A seal for a guide of a cover panel of a vehicle body panel, comprising:
   a resilient sealing profile having a reverse side for attachment to a vehicle component and a sealing side; and
   a sliding strip mounted on the resilient sealing profile wherein the resilient sealing profile has two protruding portions with the sliding strip being disposed between the two protruding portions and being recessed towards the reverse side with respect to the two protruding portions in an unstressed state.

2. The seal as recited in claim 1, wherein the sliding strip is attached on the sealing side of the resilient sealing profile.

3. The seal as recited in claim 1, wherein the sliding strip has a hardness that is greater than a hardness of the resilient sealing profile.

4. The seal as recited in claim 1, wherein the sliding ship is accommodated in a form-locking manner in the resilient sealing profile and protrudes from at least one sealing surface on the resilient sealing profile.

5. The seal as recited in claim 1, wherein the sliding strip is recessed from at least one sealing surface on the sealing side when the seal is in the unstressed state.

6. The seal as recited in claim 1, wherein the resilient sealing profile is a closed hollow profile.

7. The seal as recited in claim 1, wherein the sealing side is situated opposite the reverse side.

8. The seal as recited in claim 1, wherein the resilient sealing profile has a B-shaped cross-section with the two protruding portions forming two bulbous sealing surfaces, and wherein the sliding ship is disposed between the two bulbous sealing surfaces.

9. A sealing system for a guide of a cover panel of an openable vehicle body panel, comprising:
   a resilient sealing profile having a reverse side for attachment to a vehicle and an opposing sealing side with at least one sealing surface forming a protruding portion for contacting a vehicle part;
   a sliding strip mounted on the opposing sealing side of the resilient sealing profile distanced from the protruding portion; and
   a moveable connecting member separate from the vehicle part that contacts the sliding strip and is spaced away from the at least one sealing surface wherein during movement the moveable connecting member displaces the protruding portion.

10. The sealing system as recited in claim 9, wherein the sliding strip has a hardness that is greater than a hardness of the resilient sealing profile.

11. The sealing system as recited in claim 9, wherein the sliding strip is accommodated in a form-locking manner in the resilient sealing profile and protrudes from the at least one sealing surface.

12. The sealing system as recited in claim 9, wherein the sliding strip is recessed from the at least one sealing surface on the opposing sealing side when the resilient sealing profile is in an unstressed state.

13. The sealing system as recited in claim 9, wherein the resilient sealing profile is a closed hollow profile.

14. A sealing system for a guide of a cover panel of an openable vehicle body panel comprising:
   a resilient sealing profile having a reverse side for attachment to a vehicle and a sealing side, wherein the resilient sealing profile has at least one sealing surface forming a protruding portion and wherein the resilient sealing profile has a B-shaped cross-section having two bulbous sealing surfaces;

a sliding strip mounted on the sealing side of the resilient sealing profile distanced from the protruding portion wherein the sliding strip is disposed between the two bulbous sealing surfaces; and a connecting member that contacts the sliding strip and is spaced away from the at least one sealing surface.

15. The sealing system as recited in claim 9, wherein the moveable connecting member has an extension that contacts only the sliding strip.

16. The sealing system as recited in claim 15, wherein the extension has a wedge-shaped configuration.

17. A sealing system for a guide of a cover panel of an openable vehicle body panel, comprising:

a first resilient sealing profile having a reverse side for attachment to a vehicle at a first vehicle part and an opposing sealing side with at least one sealing surface;

a first sliding strip mounted on the opposing sealing side of the first resilient sealing profile distanced from the at least one sealing surface;

a second resilient sealing profile having a reverse side for attachment to a second vehicle part and an opposing sealing side with at least one sealing surface;

a second sliding strip mounted on the opposing sealing side of the second resilient sealing profile distanced from the at least one sealing surface; and a moveable connecting member separate from the first and second vehicle parts, the at least one sealing surface of the first resilient sealing profile being pressed against the at least one sealing surface of the second resilient sealing profile in areas to provide the sealing function, wherein the movable connecting member protrudes between the first resilient sealing profile and the second resilient sealing profile, contacts the first and second sliding strips, and during movement displaces the at least one sealing surfaces of the first and second resilient sealing profiles without contacting either sealing surface of the first and second resilient sealing profiles.

18. A vehicle body panel system, comprising:

a panel opening;

at least one cover panel that is slidable and tiltable to selectively cover the panel opening;

at least one longitudinal guide that guides the at least one cover panel;

at least one moveable connecting member disposed between the at least one longitudinal guide and the at least one cover panel; and a seal that at least partially covers the at least one longitudinal guide, the seal having a resilient sealing profile having a reverse side for attachment to a vehicle and an opposing sealing side with at least one sealing surface for contacting a vehicle part, and a sliding strip mounted on the opposing sealing side of the resilient sealing profile distanced from the at least one sealing surface, the at least one moveable connecting member being separate from the vehicle part, contacting the sliding strip, being spaced away from the at least one sealing surface, and compressing the resilient sealing profile and displacing the at least one sealing surface when the at least one cover panel is displaced.

19. The vehicle body panel system as recited in claim 18, wherein the at least one cover panel is movable vertically with respect to a vehicle panel and can be displaced over a non-movable, stationary roof segment.

20. The vehicle body panel system as recited in claim 19, wherein the seal covers at least a segment of the at least one longitudinal guide that runs beside the non-movable, stationary roof segment, wherein the seal seals off an area corresponding to the non-movable, stationary roof segment when the at least one cover panel is not displaced.

21. The vehicle body panel system as recited in claim 19, wherein the at least one moveable connecting member protrudes from the at least one longitudinal guide along the seal up to the at least one cover panel when the at least one cover panel is raised up and displaced over the non-movable, stationary roof segment, thereby contacting the sliding strip and being spaced away from the at least one sealing surface.

22. The vehicle body panel system as recited in claim 19, further comprising a second resilient sealing profile that is pressed against the resilient sealing profile to provide a sealing function, wherein the at least one moveable connecting member protrudes between the resilient sealing profile and the second resilient sealing profile.

23. The sealing system as recited in claim 9 wherein the moveable connecting member connects the cover panel to the guide.

24. A sealing system for a guide of a cover panel of an openable vehicle body panel comprising:

a resilient sealing profile having a reverse side for attachment to a first vehicle part and an opposing sealing side with at least one sealing surface forming a protruding portion for contacting a second vehicle part wherein the protruding portion lies between the first and the second vehicle parts;

a sliding strip mounted on the opposing sealing side of the resilient sealing profile distanced from the protruding portion; and a moveable connecting member separate from the first and the second vehicle parts and arranged on the same side of the protruding portion as the second vehicle part wherein the moveable connecting member contacts the sliding strip and is spaced away from the at least one sealing surface.

25. The sealing system as recited in claim 24 wherein the at least one sealing surface comprises first and second bulbous sealing surfaces with the sliding strip being arranged between the first and second bulbous sealing surfaces.

* * * * *